United States Patent
Schneider et al.

(10) Patent No.: US 7,268,675 B2
(45) Date of Patent: Sep. 11, 2007

(54) METHOD AND ARRANGEMENT FOR THE PREVENTIVE PROTECTION OF VEHICLE PASSENGERS IN DANGEROUS SITUATIONS

(75) Inventors: Marcus Schneider, Stuttgart (DE); Alfred Kuttenberger, Moeglingen (DE); Thorsten Sohnke, Hofheim (DE); Juergen Hoetzel, Florstadt (DE); Michael Schlick, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 158 days.

(21) Appl. No.: 10/525,427

(22) PCT Filed: Feb. 27, 2003

(86) PCT No.: PCT/DE03/00628

§ 371 (c)(1),
(2), (4) Date: Feb. 23, 2005

(87) PCT Pub. No.: WO2004/029654

PCT Pub. Date: Apr. 8, 2004

(65) Prior Publication Data

US 2005/0242932 A1 Nov. 3, 2005

(30) Foreign Application Priority Data

Sep. 19, 2002 (DE) ................. 102 43 508

(51) Int. Cl.
*B60Q 1/00* (2006.01)

(52) U.S. Cl. ............ 340/436; 340/435; 180/271; 701/45

(58) Field of Classification Search ........... 340/436, 340/435, 438, 517, 670; 180/271; 701/45, 701/46

See application file for complete search history.

(56) References Cited

U.S. PATENT DOCUMENTS

| | | | | |
|---|---|---|---|---|
| 5,490,069 | A * | 2/1996 | Gioutsos et al. | 701/45 |
| 5,826,216 | A * | 10/1998 | Lyons et al. | 702/143 |
| 6,087,928 | A | 7/2000 | Kleinberg et al. | 340/436 |
| 6,463,372 | B1 * | 10/2002 | Yokota et al. | 701/45 |
| 6,560,520 | B2 * | 5/2003 | Yokota et al. | 701/45 |
| 6,910,711 | B1 * | 6/2005 | Breed et al. | 280/735 |
| 6,944,543 | B2 * | 9/2005 | Prakah-Asante et al. | 701/301 |

FOREIGN PATENT DOCUMENTS

| | | |
|---|---|---|
| DE | 199 34 670 | 12/2000 |
| DE | 199 49 499 | 4/2001 |
| WO | WO 99 10803 | 3/1999 |

* cited by examiner

*Primary Examiner*—Toan N. Pham
(74) *Attorney, Agent, or Firm*—Kenyon & Kenyon LLP

(57) ABSTRACT

To protect vehicle occupants in dangerous situations, the distance of the vehicle to a roadside object, such as a guardrail, etc., is determined and compared to a critical distance. If the actual distance is less than the critical distance, alarm devices are triggered and/or reversible restraining devices are deployed. The critical distance may be determined as a function of the host vehicle velocity.

5 Claims, 2 Drawing Sheets

METHOD AND ARRANGEMENT FOR THE PREVENTIVE PROTECTION OF VEHICLE PASSENGERS IN DANGEROUS SITUATIONS

BACKGROUND INFORMATION

The protection of vehicle occupants in the case of an accident by deploying irreversible restraining means (airbags in particular) is nowadays standard, the irreversible restraining means being pyrotechnically ignited when an impact is detected by acceleration sensors in particular.

In addition, it has also become customary to investigate, even prior to the actual impact, whether there is an imminent risk of such an impact. As a function thereof, the irreversible restraining means are set to a state of readiness to very quickly enable the actual deployment when the impact is detected. Furthermore, reversible restraining means, power safety belt tensioners in particular, are activated to forcibly move the affected occupants into the best possible position in the seat. This is briefly explained below with reference to FIG. 5. FIG. 5 shows two vehicles 21 and 22, which move toward one another at velocities $V_1$ and $V_2$, respectively. While vehicle 21 is traveling on its proper right side of the road 23, second vehicle 22 has left its proper right side of the road 24. This means that there is a latent risk of collision between vehicles 21 and 22. In any case, when the distance between the two vehicles 21 and 22 traveling at a certain relative velocity $(V_1+V_2)$ drops below a certain distance, i.e., the time to impact (time=distance/relative velocity) drops below a certain time, a collision must be considered as unavoidable. When such a situation is detected, the above-mentioned preventive measures are initiated.

This procedure is basically also applicable if a single vehicle moves toward a stationary obstacle, i.e., object. Also in this case, an analyzer circuit of the vehicle will use the relative velocity with respect to the object and the distance to the object to evaluate whether or not a collision is imminent.

The conventional modes of operation thus assume the actual occurrence of a collision (crash) or the detection of an imminent, unavoidable collision.

However, the known procedures do not allow for a response to events in which the vehicle gradually approaches an object such as a guardrail, a wall, stationary, parked or slowly moving vehicles, or the like. Forces which may result in injuries, due to impact with vehicle parts in particular, may act upon vehicle occupants, unaware occupants in particular, even in the event of such a grazing contact.

An object of the present invention is therefore to provide a method and a system to effectively protect vehicle occupants even in non-impact danger situations.

SUMMARY OF THE INVENTION

This object is achieved by a method for preventive protection of vehicle occupants in dangerous situations by determining the distance of the vehicle to objects on the roadside according to size on an ongoing basis, determining whether this distance is less than a critical distance, and initiating protective measures in response to such a determination.

A system for carrying out the method is characterized by appropriate sensors and an analyzer circuit.

It is to be assumed that the appropriate sensor system for detecting objects in the vehicle's surroundings is already present in the vehicle, and thus the relative distance of the host vehicle to objects on the roadside, such as guardrails, parked cars, walls, and the like, is detectable, and furthermore sensors for determining the host vehicle velocity are also available. Therefore, only one analyzer circuit must be provided, which determines whether or not the actual distance is less than a critical distance. Appropriate measures may be taken on the basis of this determination.

The critical distance is preferably determined as a function of the relative velocity of the vehicle with respect to the object on the roadside.

DETAILED DESCRIPTION

Figure 2:
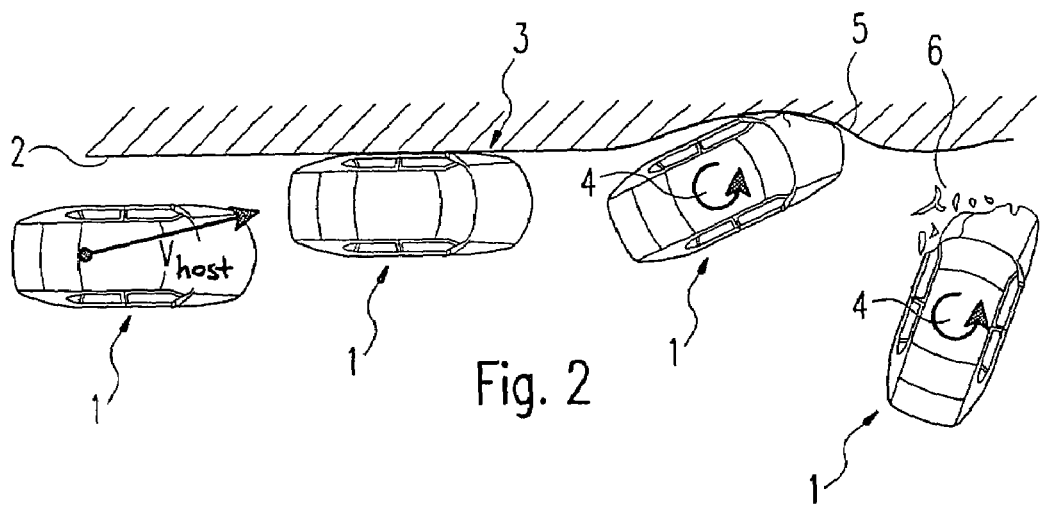
FIG. 2 schematically shows the consequences and perils of a vehicle gradually approaching an object on the roadside such as a guardrail.

First, the dangers as vehicle 1 gradually approaches a guardrail 2 on the roadside are explained with reference to FIG. 2. According to the different representations of FIG. 2, vehicle 2 approaches a guardrail 2 very gradually, i.e., at a very small angle. Conventional collision detection systems do not recognize this situation as a (possible) collision. Such situations may often occur, for example, due to the driver's lax attentiveness, unfavorable visibility conditions, a narrowing roadway at construction sites, or the like. Therefore, the contact of vehicle 1 with guardrail 2 is not an impact, but a grazing contact 3 which, in any case at higher vehicle speeds $V_{host}$ may result in rotational pulses 4 and therefore in deformations 5 of the guardrail and 6 of vehicle 1. The forces thus generated also act on the vehicle's occupants; high centrifugal forces are generated by the rotation due to rotational pulses 4. Therefore, it is possible that vehicle occupants are thrown against vehicle parts, where they may become injured.

Figure 1:
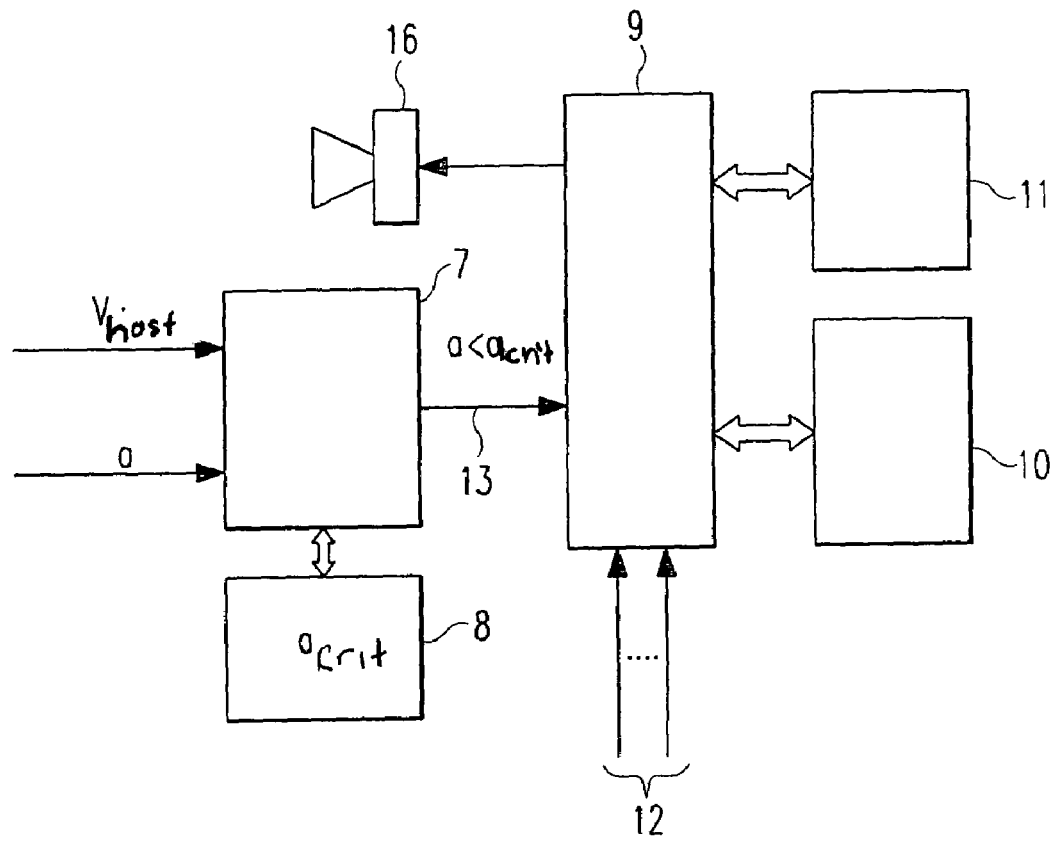
FIG. 1 schematically shows the basic structure of a system for carrying out the method according to the present invention.

FIG. 1 shows a system responding, according to the present invention, to situations which are dangerous for the vehicle's occupants.

With the aid of suitable sensors or by the processing of signals delivered by sensors provided in vehicle 1, first of all, distance a or the offset of vehicle 1 with respect to the edge of the roadway, particularly guardrail 2, as ascertained, and is compared in a comparator circuit 7 to a critical distance $a_{crit}$ provided and fed by a memory 8. If actual distance a is less than critical distance $a_{crit}$, comparator circuit 7 outputs corresponding a signal 13 to a trigger circuit 9, which is provided for triggering and deploying different restraining means, for example, irreversible restraining means 10, such as air bags, pyrotechnically ignitable seat belt tensioners, and the like, and reversible restraining means 11, such as power-activated seat belt tensioners, trigger circuit 9 basically operating in a conventional manner on the basis of other signals 12 and acting on restraining means 10 and 11 in the event of a collision.

Signal 13, indicating that the actual distance is less than critical distance $a_{crit}$, is used according to the present invention to activate reversible restraining means 11. It may also be used to prepare the activation of irreversible restraining means 10, because it cannot be ruled out that even a gradual approach may result in a collision which makes the deployment of irreversible restraining means 10 seem necessary.

Figure 3:
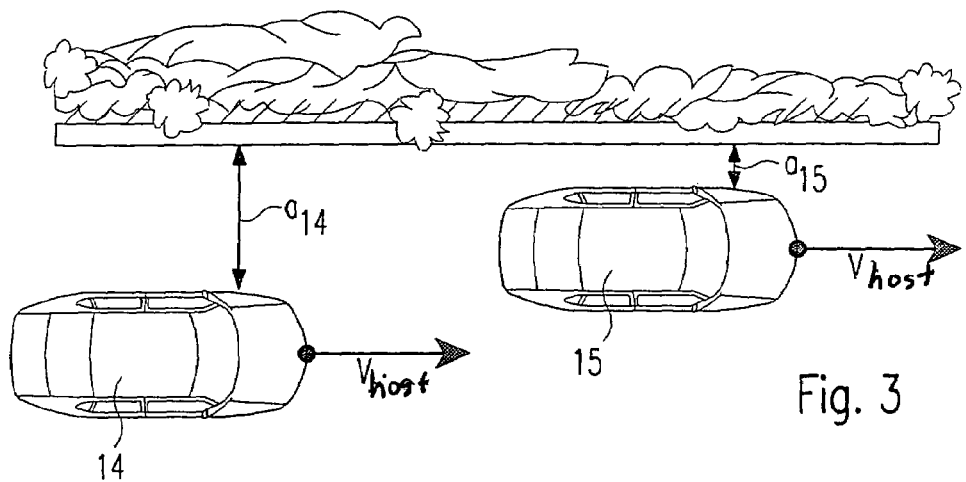
FIG. 3 shows two typical situations of a vehicle to elucidate the present invention.
Figure 4:
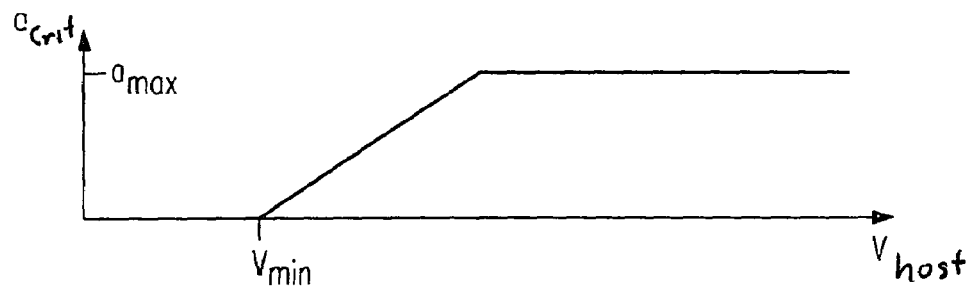
FIG. 4 shows the curve of the preferred dependence of the critical distance on the host vehicle velocity.
Figure 5:
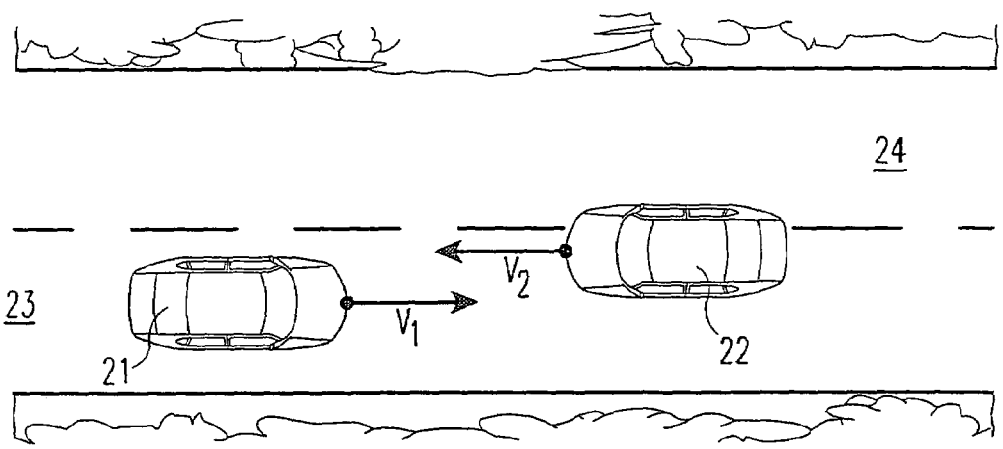
FIG. 5 schematically shows the conventional situation in the event of an imminent collision.

The potential danger for the occupants of a vehicle 1 in the event of such a gradual approach to a roadside object, such as a guardrail 2, may be considered a function of velocity $V_{host}$ of host vehicle 1. FIG. 3 shows two vehicles 14 and 15 traveling at the same velocity $V_{host}$ but at different distances to the roadside $a_{14}$ and $a_{15}$, respectively. It is obvious that, given the same velocity, the danger of contact is considerably greater for vehicle 15, which is closer to guardrail 2, than for the other vehicle 14. Empirical studies have found that, as of a certain distance from guardrail 2, the danger of gradual contact with guardrail 2 is independent of vehicle velocity $V_{host}$. Empirical studies have furthermore shown that, below a certain vehicle velocity, even given a very small distance to guardrail 2, a grazing contact which could be dangerous for vehicle occupants is no longer to be expected. Therefore, it is advisable, as shown in FIG. 1, to also determine the host vehicle velocity, and to supply a corresponding signal $V_{host}$ to comparator circuit 7, and furthermore to store in memory 8 the dependence of critical distance $a_{crit}$ on host vehicle velocity $V_{host}$, shown schematically in FIG. 4, and to retrieve critical distance $a_{crit}$ assigned to the respective host vehicle velocity from memory 8 and compare it to actual distance a in comparator 7.

According to one refinement of the present invention, if actual distance a is less than a critical distance $a_{crit}$, it is advisable to activate an acoustic and/or visual alarm 16, schematically represented by a loudspeaker, to call the driver's attention to this situation which is potentially dangerous for the vehicle's occupants.

In this context, and what is not shown in detail, the values for critical distance $a_{crit}$, whose undershooting triggers alarm 16 and whose undershooting triggers the deployment of irreversible restraining means, may differ, the values in the first case being higher than in the second case. Alarm 16 may not only be triggered by trigger circuit 9, but also directly by comparator 7.

It is to be pointed out that distance a of vehicle 1 from guardrail 2 and other roadside objects may be determined directly by sensors which are already customary such as video, radar, lidar, ultrasound, and the like or derived from corresponding signals. Velocity $V_{host}$ of host vehicle 1 may be determined, for example, by detecting the wheel speed or retrieved from an on-board system such as a CAN on-board bus.

If the situation that gave rise to signal 13 no longer exists, i.e., the corresponding danger is no longer present, reversible restraining means 11 are reset and alarm 16 is deactivated. This danger situation is no longer present if actual distance a is again (clearly) greater than critical distance $a_{crit}$ or if the vehicle has stopped, or the vehicle is traveling at a velocity which is (clearly) less than the minimum vehicle velocity according to the curve of FIG. 4.

What is claimed is:

1. A method for preventive protection of vehicle occupants in dangerous situations, the method comprising:
   determining a distance of the vehicle to objects on a roadside on an ongoing basis according to size;
   determining whether the distance is less than a critical distance;
   initiating protective measures as a function of the determination;
   determining a host vehicle velocity by magnitude;
   determining the critical distance as a function of the determined host vehicle velocity; and
   if the determined distance again exceeds the critical distance, canceling the initiated protective measures again.

2. The method according to claim 1, wherein, if it is determined that the actual distance is less than a first critical value, protective measures of a first kind are initiated, and if it is determined that the actual distance is less than a second critical value, which is less than the first critical value, protective measures of a second kind are initiated.

3. The method according to claim 2, wherein the protective measures of the first kind include at least one of an audible and visible signaling to a driver of the vehicle.

4. The method according to claim 2, wherein the protective measures of the second kind include at least one of (a) an activation of at least one reversible restraining device and (b) a preparation of at least one irreversible restraining device.

5. A method for preventive protection of vehicle occupants in dangerous situations, the method comprising:
   determining a distance of the vehicle to objects on a roadside on an ongoing basis according to size;
   determining whether the distance is less than a critical distance;
   initiating protective measures as a function of the determination;
   determining a host vehicle velocity by magnitude; and
   determining the critical distance as a function of the determined host vehicle velocity,
   wherein the critical distance is determined in such a way that below a predefined host vehicle velocity, the critical distance is zero, and above a predefined distance, the critical distance is independent of the host vehicle velocity, and between the two values, a relationship between the host vehicle velocity and the critical distance runs in a substantially linear fashion, according to a predefined function.

* * * * *